United States Patent
Ishibashi

(10) Patent No.: US 10,205,878 B2
(45) Date of Patent: Feb. 12, 2019

(54) IMAGE PROCESSING APPARATUS, IMAGE-CAPTURING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Tohru Ishibashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/368,165

(22) Filed: Dec. 2, 2016

(65) Prior Publication Data

US 2017/0163890 A1    Jun. 8, 2017

(30) Foreign Application Priority Data

Dec. 4, 2015 (JP) ................................ 2015-237264

(51) Int. Cl.
| | | |
|---|---|---|
| H04N 5/232 | (2006.01) | |
| G06T 7/215 | (2017.01) | |
| G06T 7/246 | (2017.01) | |
| G06T 7/00 | (2017.01) | |
| G06T 3/40 | (2006.01) | |

(52) U.S. Cl.
CPC ....... *H04N 5/23238* (2013.01); *G06T 3/4038* (2013.01); *G06T 7/215* (2017.01); *G06T 7/246* (2017.01); *G06T 7/97* (2017.01); *H04N 5/23232* (2013.01); *H04N 5/23293* (2013.01); G06T 2207/10016 (2013.01); G06T 2207/20221 (2013.01)

(58) Field of Classification Search
CPC ....... H04N 5/23238; G06T 7/97; G06T 7/215; G06T 7/246
USPC ......................................................... 348/42
See application file for complete search history.

(56) References Cited

U.S. PATENT DOCUMENTS

| | | | |
|---|---|---|---|
| 8,600,194 B2 | 12/2013 | Doepke | |
| 9,621,799 B2* | 4/2017 | Okamoto | ........... H04N 5/23238 |
| 2011/0110605 A1* | 5/2011 | Cheong | .............. H04N 5/23238 |
| | | | 382/284 |
| 2011/0298888 A1* | 12/2011 | Shimada | ................ G03B 37/00 |
| | | | 348/37 |
| 2012/0263397 A1* | 10/2012 | Kimura | .................. G06T 3/4038 |
| | | | 382/284 |
| 2012/0293608 A1* | 11/2012 | Doepke | .............. H04N 5/23238 |
| | | | 348/36 |

(Continued)

FOREIGN PATENT DOCUMENTS

| | | |
|---|---|---|
| JP | 2005-328497 A | 11/2005 |
| JP | 2014-519739 A | 8/2014 |

*Primary Examiner* — Tung T Vo
(74) *Attorney, Agent, or Firm* — Cowan, Liebowitz & Latman, P.C.

(57) ABSTRACT

An image processing apparatus configured to generate a panoramic image by combining a plurality of images includes a first acquirer configured to acquire information of a first moving amount of the image based on a common area of the plurality of images, and an aligner configured to align the plurality of images based on difference information between the first moving amount and a second moving amount of the image acquired based on position information of an image-capturing apparatus configured to capture the plurality of images, and information of the second moving amount.

16 Claims, 6 Drawing Sheets

(56) References Cited

U.S. PATENT DOCUMENTS

2012/0293609 A1* 11/2012 Doepke .............. H04N 5/23238
                                                          348/36
2012/0293610 A1* 11/2012 Doepke .............. H04N 5/23238
                                                          348/36
2012/0294549 A1* 11/2012 Doepke ................ G06T 3/4038
                                                         382/294

* cited by examiner

PANORAMIC VIEW

FIRST CAPTURED IMAGE

↔ COMMON AREA

SECOND CAPTURED IMAGE

COMBINATION RESULT

IMAGE PROCESSING APPARATUS, IMAGE-CAPTURING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image-capturing apparatus, an image processing method, and a non-transitory computer readable storage medium.

Description of the Related Art

Japanese Patent Laid-Open No. 2005-328497 proposes a method for generating a panoramic image by sequentially changing an image-capturing direction, by capturing part of an image-capturing range, and by overlapping the captured images so that the partial areas can be superimposed on each other in the image-capturing image. Japanese PCT Domestic Publication No. 2014-519739 proposes a highly precise alignment method by using a position information acquirer, such as a gyro sensor, and by feeding the information back to the search for the common area.

A moving amount of an image calculated from the information obtained by the position information acquirer do not always accord with a moving amount of the image detected from the actual captured image. For example, the gyro sensor has a different offset according to the temperature. The offset value is output even when the gyro sensor stands still, and a change of the offset value may cause a misdetection. It is ideal for the panoramic imaging to capture an image while the camera is being swung around a nodal point, but a shift movement is actually applied to the camera in addition to swinging, causing an error. An angle of view of a lens is one parameter in calculating a moving amount based on the gyroscopic information. When a filter configured to change the angle of view, such as a wide converter is attached to the lens, or in the underwater photography, the moving amount cannot be calculated based on the gyroscopic information because a precise angle of view cannot be obtained. Thus, the alignment is likely to contain an error based on the gyroscopic information due to a variety of factors.

SUMMARY OF THE INVENTION

The present invention provides an image processing apparatus, an image-capturing apparatus, an image processing method, and a non-transitory computer readable storage medium, which can generate a highly precise panoramic image.

An image processing apparatus according to one aspect of the present invention configured to generate a panoramic image by combining a plurality of images includes a first acquirer configured to acquire information of a first moving amount of the image based on a common area of the plurality of images, and an aligner configured to align the plurality of images based on difference information between the first moving amount and a second moving amount of the image acquired based on position information of an image-capturing apparatus configured to capture the plurality of images, and information of the second moving amount.

Further features of the present invention will become apparent from the following description of exemplary embodiments with reference to the attached drawings.

DESCRIPTION OF THE EMBODIMENTS

Figure 2A:
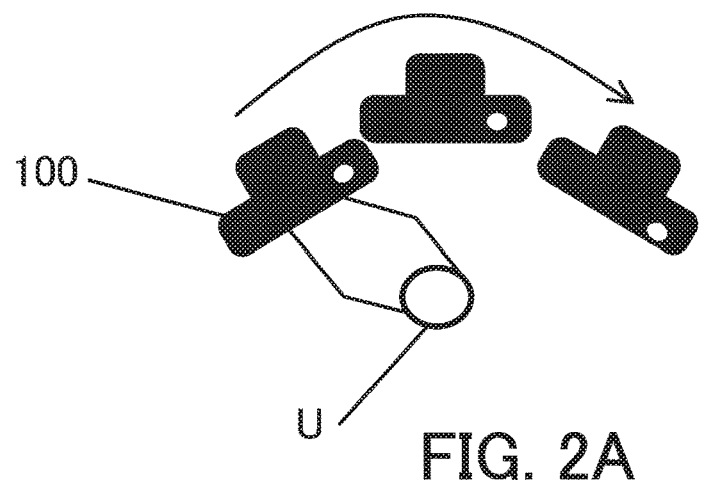
FIGS. 2A and 2B are views for explaining panoramic imaging and a generation of a panoramic image.

FIG. 2A is a view illustrating a movement in the panoramic imaging. In the panoramic imaging, images are consecutively captured while an image-capturing apparatus 100 is moved manually by a user U (or automatically by an unillustrated pan head, etc.).

Figure 2B:
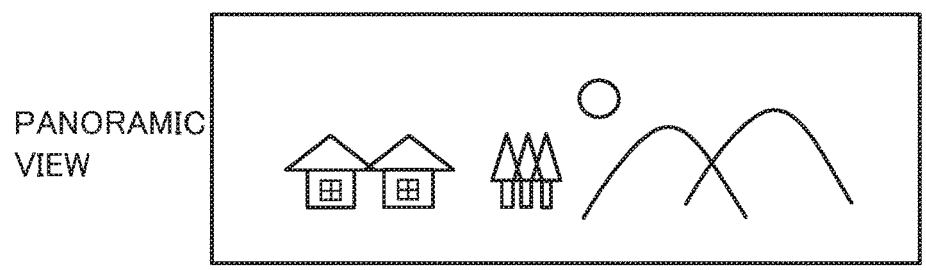
Figure 2B:
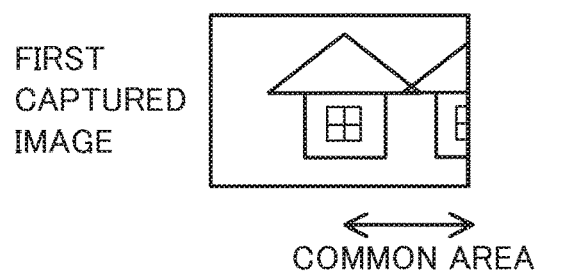
Figure 2B:
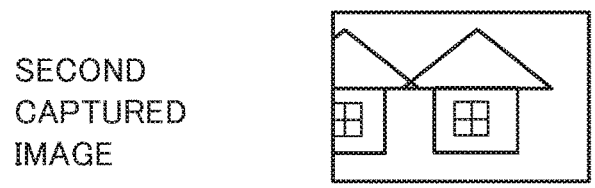
Figure 2B:

FIG. 2B conceptually illustrates combinations of images. In the panoramic imaging, a plurality of images are captured so that part of an object is superimposed in the captured images. A moving amount calculation circuit 116c, which will be described later, extracts a feature point of a common area in each image, and detects a motion vector representative of a moving distance of the feature point. For example, an affine transformation coefficient is obtained from a motion vector, and two images are superimposed with each other so that the feature points accord with each other. Thereby, an image is acquired which has extended part other than the common area, and a panoramic image with a wider than each captured image is generated by repeating this process a plurality of times. An image-capturing apparatus, a dedicated image processing apparatus, and a computer in which an image processing method (program) is installed can generate a panoramic image combining a plurality of images.

In aligning images captured with different capturing angles, a cylindrical conversion configured to project a captured image onto a virtual cylinder may be made in order to reduce an image shift at the joint.

A motion vector is detected by extracting a feature point in an image and by finding (calculating) how long the feature point has moved between images. A known method is applicable to the extraction of the feature point. For example, an edge is extracted using a method for extracting only luminance information of the two cylindrically converted images, for shifting the image by one to several pixels, and for subtracting the shifted image from the original image so as to calculate the absolute value, a method for high-pass filtering only illuminance information extracted from an image, and for subtracting the result from the original illuminance information image, etc. A moving amount can be calculated by subtracting a plurality of shifted edge images and by calculating a position that makes the difference small.

Since it is necessary to extract a plurality of feature points, the image is divided into a plurality of blocks. The block division depends on the number of pixels and the aspect ratio in the image, but (4×3=) 12 to 96×64 blocks are generally set. When the number of blocks is too small, a trapezoid in the tilted image-capturing apparatus, a rotation around the optical axis direction, or another correction is not available. When the number of blocks is too large, one block is small and close to the feature point, causing an error. The number of blocks is set according to the number of pixels, the finding ease of the feature point, the angle of view of the object, and the like.

The alignment method may utilize a Euclid conversion that allows a rotation and a parallel movement, an affine conversion that also allows them, a projection conversion that allows a trapezoid correction, or the like, but cannot utilize a linear conversion that does not allow the parallel movement.

The Euclid conversion is applicable to the movement in the X or Y axis or the rotation around each axis. However, the actual imaging in the camera contains handshakes in the back and forth directions and in the pan and tilt directions. In general, the affine conversion used which can correct an enlargement, a skew, and the like. When a coordinate (x, y) of the feature point as a reference is moved to a coordinate (x', y'), the affine conversion is expressed as follows.

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \qquad (1)$$

This 3×3 matrix is called an affine coefficient. In the affine conversion, the affine coefficient can be calculated if shifts of at least three feature points are detected. When the feature points are close to each other or linearly arranged, the affine conversion is not precise at a position farther than the feature points. The feature points may be distant from one another and may not be linearly arranged. When a plurality of feature points are detected, the close feature point is removed and the rest is normalized by the least squares method.

Thus aligned two images may be combined with different combination ratios so that the border does not stand out.

The feature point may not be extracted or may be erroneously detected, such as an object having a few edge, such as a cloud, and a dark part at night in extracting the above edge. The misdetected example is a repetition view of a similar pattern, such as a striped pattern and an artificial building (e.g., a skyscraper). The misdetection it likely to occur in a scene in which a shape and a position change for each capture, such as a surface of the water and a train.

This case may use information of a position detector (orientation detector), such as a gyro sensor, built in the image-capturing apparatus or the lens apparatus that is attachable to and detachable from the image-capturing apparatus. For example, assume that is an image-capturing optical system attached to image-capturing apparatus has a focal length of f (mm), the image-capturing apparatus has been rotated between the previous imaging and the current imaging by an angle of r degrees (°), and the image sensor has a pixel pitch of p (μm). Then, a moving amount d [pixel] can be approximated by Expression 2. Influence of the distortion of a lens is herein ignored for simple description purposes, but the distortion and other errors may be considered.

$$d[\text{pixel}] = \tan(r[°] \div 180 \times \pi) \times f[\text{mm}] \times 1000 \div p[\mu m] \qquad (2)$$

Figure 3:
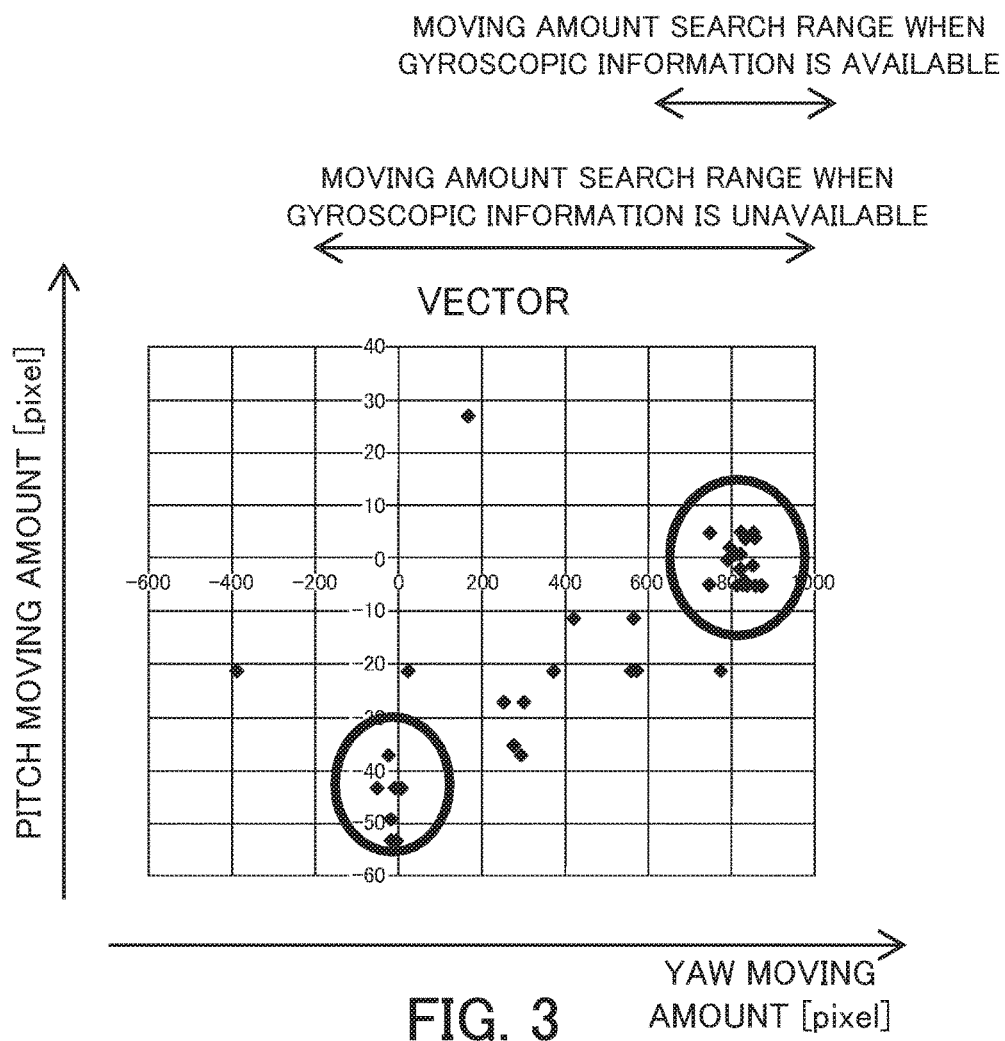
FIG. 3 is a view illustrating a calculation result of a moving amount from an image.

FIG. 3 is a graph illustrating a calculation example of a moving amount of each block in a certain image. The abscissa axis in the graph indicates a moving amount [pixel] in the yaw direction, and the ordinate axis indicates a moving amount [pixels] in the pitch direction. As described above, the moving distance is detected in the unit of block which is made by dividing an image. FIG. 3 illustrates blocks moved by 800 [pixel] calculated in the yaw direction, and blocks moved by −40 to −60 pixels calculated in the pitch direction without moving in the yaw directions. In calculating the moving amount from the image, it is impossible to determine which moving amount of the blocks is correct.

If the moving amount is calculated based on Expression 2 and the output of the gyro sensor, and if the shift in the yaw direction is found by 800 [pixel], it is understood that the shift in the pitch direction is detected by mistake and the misdetection can be prevented. A search range of the moving amount of the feature point can be narrowed by using the gyroscopic information, and the process can be expedited. Without the gyroscopic information, it is necessary, for example to search a range from −1000 [pixel] to +1000 [pixel] in the yaw direction. If a movement of +800 [pixel] is known by the gyroscopic information, a search range from about +600 [pixel] to +100 [pixel] may be enough. This value depends on the focal length of the lens and the swing speed, and is not limited.

When the feature point cannot be extracted, the moving amount is calculated based on Expression 2 and the output of the gyro sensor, and used for the alignment as it is. An offset as a signal output when the gyro sensor stands still varies according to individuals and temperatures. Usually, an offset amount when the gyro sensor stands still in the normal temperature is stored in the nonvolatile memory in the image-capturing apparatus, and subtracted from the output signal in use. Thus, the offset subtracted value is used.

The offset under a high or low temperature is different from that in the normal temperature, and thus the offset cannot be precisely eliminated. The panoramic imaging can capture dozens of images at one time, and the temperature of the image-capturing apparatus is likely to rise. In this case, the offset cannot be fully eliminated and the moving amount obtained based on the gyroscopic information cannot be precisely calculated. When the zoom lens is used, the focal length may not be precisely recognized due to the clearance of the zoom ring. In addition, in an optical system in which an angle of view varies according to the focus position, the moving amount acquired from the gyroscopic information can be different from the moving amount detectable from the actual image.

The optical system may include a filter and an optional lens configured to change a focal length. For example, when a conversion lens or an extender is used for wide-angle or telephoto imaging rather than an original angle of view of the optical system, the moving amount acquired from the gyroscopic information can also be different from the moving amount detectable from the actual image. When an external refractive index is different from that of the air, as in the underwater imaging, the focal length changes and thus a similar case occurs.

Thus, the moving amount calculated from the gyroscopic information can be different from the moving amount detected from the image for a variety of factors as well as the offset changes of the gyro sensor. In this situation, if the images are aligned only with the moving amount calculated from the gyroscopic information because the moving amount cannot be calculated from the image, the first image actually shifts from and combined with the second image and the quality of the panoramic image deteriorates.

This embodiment corrects the moving amount (second moving amount of the image acquired from the position information of the image-capturing apparatus) calculated from the gyroscopic information. Initially, the user sets a panoramic imaging mode and starts the image-capturing. A first image is captured, and an output of the image sensor is A/D-converted and read by the image processing circuit. The image processing circuit develops the image and stores a general image, such as a YUV image, in a memory. At this time, the distortion of the image-capturing optical system and the light quantity drop at the periphery may be corrected and the above cylindrical conversion may be performed. This is applied to the second capture. The moving amount is calculated based on the two images as described above and converted into the affine coefficient. A gyroscopic signal is read at the capturing timing, and a moving distance of the image-capturing apparatus between the first and second images is calculated. The moving amount is calculated using Expression 2, the angle of view of the image-capturing optical system, the pitch width in the image sensor, etc. A correction amount is calculated from a difference between these two moving amounts.

The consecutive capturing speed differs according to the mechanical design of the image-capturing apparatus, the processing speed of the image processing circuit, etc., but a time difference is, for example, 0.2 seconds between the first and second images when the frame rate is 5 frames per second. When this interval is constant, the correction amount may simply use a difference between the moving amount calculated from the image and the moving amount calculated from the gyroscopic information. For example, when the moving amount calculated from the image is 400 [pixel] and the moving amount calculated from the gyroscopic information etc. is 405 [pixel], an error of 5 [pixel] occurs for 0.2 seconds. If the capturing interval not constant, it is necessary to adjust the correction amount according to the capturing time interval.

When the third image is captured and the moving amount can be calculated from the image, the alignment is performed using the moving amount. When the moving amount cannot be calculated from the image, the moving amount is calculated from the gyroscopic information, and the alignment is performed with the moving amount to which the above correction amount is added. This procedure is repeated.

The moving amount cannot always be calculated based on the first and second images after the capture starts. In that case, until the object can become calculated, captured images, such as the first captured image, the second captured image, the m-th captured image, are temporarily stored in the memory (storage unit). When the object can become calculated, the correction amount is calculated by the above method, and retroactively applied to the first captured image, the second captured image, the m-th captured image for the appropriate alignment and combination. At this time, the aligned images may not be consecutively captured images. In other words, the aligned images may not be the m-th captured image and the (m+1)-th captured image, and the correction amount may be calculated from the m-th captured image and the n-th captured image. In this case, it is necessary to adjust the correction amount based on the capturing interval time period, where m and n are positive numbers and n is larger than m (n>m).

The moving amount calculated from the gyroscopic information can be roughly calculated although the precision is lower unless it is corrected. The uncorrected moving amount can be roughly calculated from the m-th captured image and the n-th captured image. When the m-th captured image and (m+2)-th captured image have many common parts, it is unnecessary to store the (m+1)-th captured image so as to save the capacity of the memory. It is not always necessary to store the entire surface of the image, and the capacity can be saved by storing the image trimmed to the maximum search area. In other words, the controller may determine whether there is redundancy in generating the panoramic image, and may not store the redundant image (part) in the memory.

Instead of calculating the correction amount after the panoramic imaging starts, the correction amount may be calculated before the panoramic imaging starts. In the actual panoramic imaging, the imaging start scene is not always the main object. Therefore, the moving amount may not be calculated from the image when the imaging starts due to an unfocused object, a low contrast object, etc.

The correction amount may be calculated in the imaging preparation or after the main object is focused. In general, an object to be focused needs a contrast to some extent whether the focusing is manual focusing or an autofocusing. Therefore, the correction amount may be calculated when the object is focused.

The correction amount may be calculated only once after the imaging starts, but may be calculated a plurality of times when it becomes necessary to adjust the correction amount, such as when the temperature rises during the imaging. The correction amount may be calculated a plurality of times when the temperature changes near the gyroscope, when the swing speed or angular speed changes, when the focal length or the focus position of the image-capturing optical system changes, when the camera has moved in a roll direction with respect to the optical axis, etc. Of course, the condition is not limited.

When the temperature near the gyroscope changes, the correction amount may be updated because the offset signal for the gyroscope changes.

Figure 4:
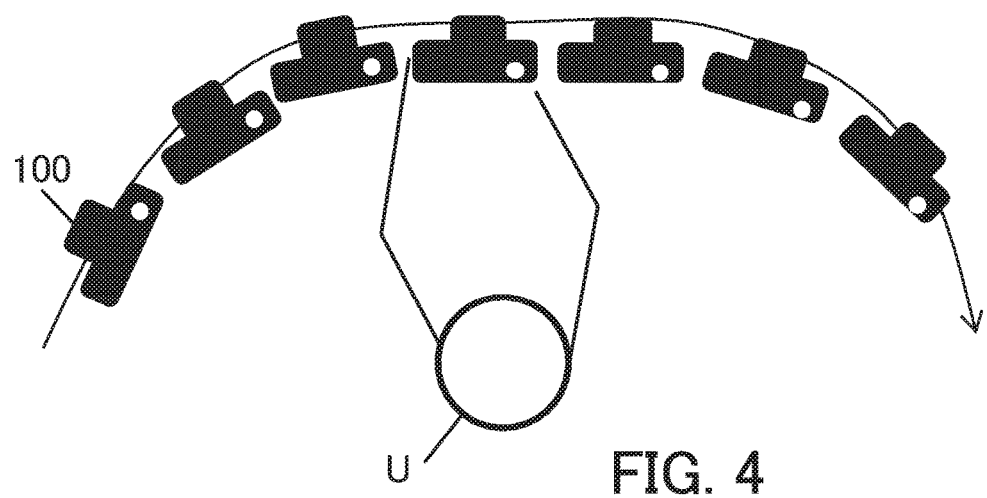
FIG. 4 is a conceptual view in the panoramic imaging.

In the manual swing, the swing way may change from the swing component to the shift component when the image-capturing apparatus is located in front of the user, as illustrated in FIG. 4, although the change depends on the user's habit. The angular speed decreases even when the user thinks that he is swinging at a constant speed. It is then necessary to update the correction amount because the parallax caused by the shift component is added to an error factor between the moving amount calculated from the image and the moving amount calculated from the gyroscope.

This is the case the distance to the object changes because the parallax amount changes. When the distance to the object is approximately infinite, the object light becomes almost parallel and the parallax does not occur even when the shift component is applied. However, for a short-distance object, the parallax occurs with the shift component. It is thus necessary to update the correction amount because there is a difference between the moving amount calculated from the image and the moving amount calculated from the gyroscope.

As understood from the above description, it is necessary to update the correction amount when the focal length of the image-capturing optical system changes. When the image-capturing optical system includes a lens that changes an angle of view as the focus position changes, a similar update is necessary.

When the correction amount is calculated a plurality of times, when the correction amount is used becomes an issue. Although the last correction amount may be used, but the correction amount whose actual correction condition is close to the condition on which the correction amount is acquired may be used.

For example, when the user swings the image-capturing apparatus, the angular speed is initially low and gradually accelerates. The angular speed reaches a certain constant speed, and then decelerates when the imaging is close to an end. As described above, the shift component increases when the image-capturing apparatus is located near the front of the user, and the angular speed may temporarily decrease. When the imaging is close to an end, the angular speed does not decelerate when the user continues to swing the image-capturing apparatus after the imaging ends.

Where the angular speed decelerates, for example, when the imaging is close to an end, when the image-capturing apparatus is located in front of the user, etc., the correction amount that has been acquired after a similar imaging start acceleration may be used instead or using the last acquired correction amount.

Figure 5:
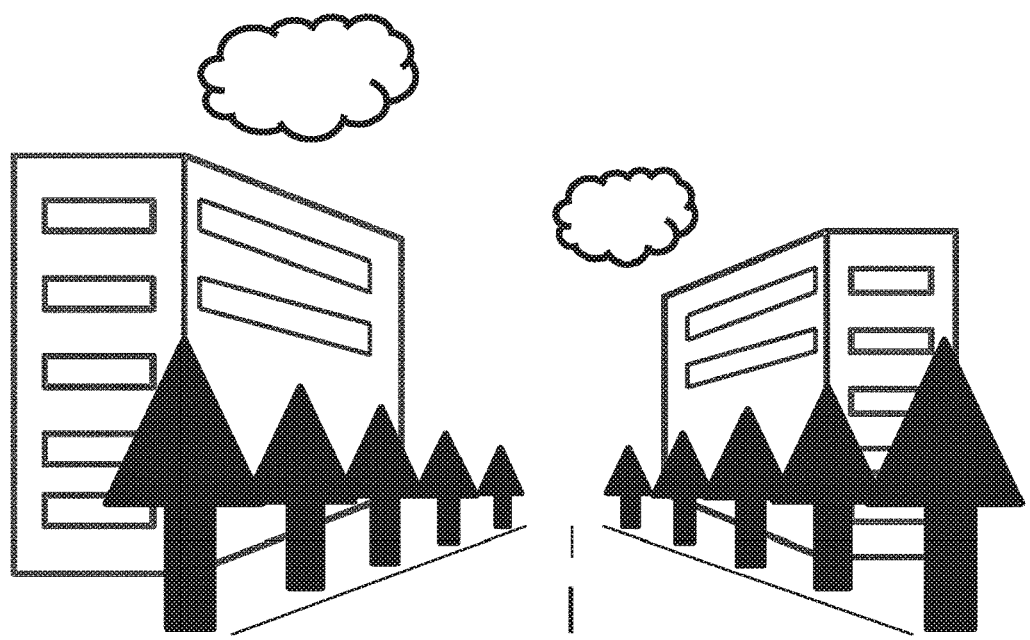
FIG. 5 is a view of an illustrative object in the panoramic imaging.

As in a scene illustrated in FIG. 5 where the distance to the object changes during one imaging action, the object is initially close of the imaging, far in front of the user, and close at the end of the imaging. Even in this case, the correction amount acquired with a similar object distance is used for the object distance at the correcting timing.

While an application of the correction amount has been described with the angular speed and the distance to the object, those skilled in the art can properly apply the correction amount to other cases. The precision of the panorama combination can be improved by correcting a moving amount calculated from the image based on the moving amount thus calculated based on the image.

First Embodiment

Figure 1:
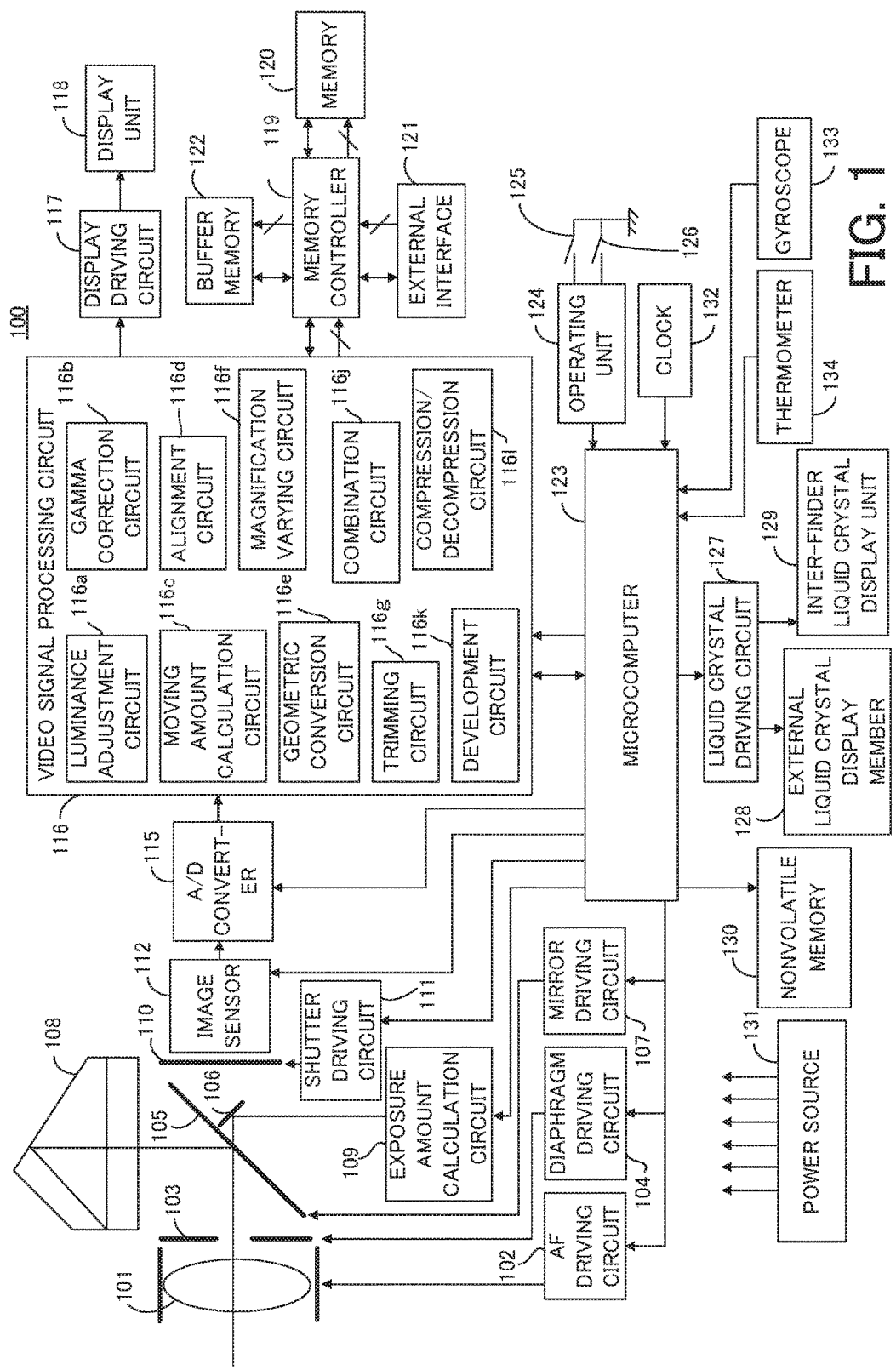
FIG. 1 is a block diagram of an image-capturing apparatus according to first, second, and third embodiments of the present invention.

FIG. 1 is a block diagram of a digital camera that has a built-in image processing apparatus (image processor) according to a first embodiment.

In FIG. 1, reference numeral 101 denotes an image-capturing optical system configured to form an optical image of an object. Reference numeral 102 denote an AF (autofocus) driving circuit. The AF driving circuit 102 includes, for example, a DC motor or a stepping motor, and provides focusing by changing a position of a focus lens in the image-capturing optical system 101 under control of the microcomputer 123.

Reference numeral 103 denotes a diaphragm (aperture stop) configured to adjust a light quantity. Reference numeral 104 denotes a diaphragm driving circuit configured to drive the diaphragm 103. An amount to be driven is calculated by the microcomputer 123, and changes an F-number (optical aperture value).

Reference numeral 105 denotes a main mirror configured to switch incident light from the image-capturing optical system 101 between the viewfinder side and the image sensor side. Usually, the main mirror 105 is disposed so as to guide and reflect the light flux to the viewfinder side. However, when the image is captured or when the image is sequentially displayed by the live-view display, the main mirror 105 is moved up and retreats from the light flux so as to introduce the light flux to the image sensor 112. The main mirror 105 is such a half-mirror that its center can transmit part of the light flux, which then enters a focus detecting sensor.

Reference numeral 106 denotes a sub mirror configured to guide and reflect the light flux that has transmitted through the main mirror 105 to the unillustrated focus detecting sensor and a sensor in the exposure amount calculation circuit 109. Reference numeral 107 denotes a mirror driving circuit configured to drive the main mirror 105 under control of the microcomputer 123. Reference numeral 108 denotes a pentaprism that included in a viewfinder optical system. The viewfinder optical system further includes a focus plate, an unillustrated eyepiece lens, etc. Reference numeral 109 denotes an exposure amount calculation circuit. The light flux that has transmitted through the center in the main mirror 105 and is reflected on the sub mirror 106 reaches the photoelectric conversion sensor disposed in the exposure amount calculation circuit 109. A defocus amount used to calculate a focusing state is found by calculating the output of this sensor.

The microcomputer 123 evaluates the calculation result and instructs the AF driving circuit 102 to drive the focus lens. Reference numeral 110 denotes a focal plane shutter. Reference numeral 111 denotes a shutter driving circuit configured to drive the focal plane shutter 110. The opening time of the focal plane shutter 110 is controlled by the microcomputer 123.

Reference numeral 112 denotes an image sensor, such as a CCD and CMOS sensor, configured to convert an object image formed by the image-capturing optical system 101 into an electric signal. Reference numeral 115 denotes an A/D converter configured to convert an analog output signal from the image sensor 112 into a digital signal.

Reference numeral 116 denotes a video signal processing circuit (image processor) including a logic device, such as a gate array. The video signal processing circuit 116 may be comprised by a dedicated image processing apparatus or a personal computer (PC) in which an image processing method is installed.

The video signal processing circuit 116 includes a luminance adjustment circuit 116a, a gamma correction circuit 116b, a moving amount calculation circuit 116c, an alignment circuit 116d, a geometric conversion circuit 116e, a magnification varying circuit 116f, a trimming circuit 116g, a combination circuit 116j, a development circuit 116k, and a compression/decompression circuit 116l.

The luminance adjustment circuit 116a adjusts the brightness using a digital gain. The gamma correction circuit 116b adjusts the luminance using a gamma characteristic. The moving amount calculation circuit (first acquirer) 116c acquires (calculates) information of a first moving amount in the image based on the common area in a plurality of images.

The alignment circuit (aligner) 116d aligns the plurality of images according to the moving amount. The aligner 116d aligns a plurality of images based on difference information between a first moving amount and a second moving amount acquired based on position information of the image-capturing apparatus that has captures a plurality of images, and information of the second moving amount. The alignment circuit 116d aligns a plurality of images based on the information of the first moving amount when the information of the first moving amount is available, and aligns plurality of images based on the difference information and the information of the second moving amount when the information of the first moving amount is unavailable.

The geometric conversion circuit 116e provides a cylindrical conversion, corrects a distortion of the image-capturing optical system 101, and performs an affine conversion. The trimming circuit 116e cuts out part of the image. The magnification varying circuit 116f varies a magnification of the image size. The combination circuit 116j combines the plurality of images with one another. The development circuit 116k develops the image. The compression/decompression circuit 116l converts a format of the image into a general image format, such as JPEG.

Reference numeral 117 denotes a display driving circuit. Reference numeral 118 denotes a display unit, using, for example, TFT and organic EL. Reference numeral 119 denotes a memory controller. Reference numeral 120 denotes a memory. Reference numeral 121 denotes an external interface connectable to a computer etc. Reference numeral 122 denotes a buffer memory.

The microcomputer 123 acquires the information of the second moving amount based on the position information of the image-capturing apparatus, such as an orientation, a speed, an angular speed, and an acceleration. The microcomputer 123 also serves as a second acquirer configured to acquire the difference information.

The video signal processing circuit 116 performs a filter process, a color conversion process, and a gamma process for the digitized image data, a compress process, such as JPEG, and outputs the result to the memory controller 119. In this case, the image that is being processed may be temporarily stored in the buffer memory 122. The video signal processing circuit 116 may output a video signal from the image sensor 112 and image data inversely input from the memory controller 119 through the display driving circuit 117 to the display member 118. A function is switched under control of the microcomputer 123.

The video signal processing circuit 116 can output information, such as exposure information of a signal from the image sensor 112 and a white balance, to the microcomputer 123, if necessary. The microcomputer 123 instructs a white balance and a gain adjustment based on the above information.

In the consecutive capturing, the captured data is once stored as unprocessed image in the buffer memory 122, unprocessed image data is read out through the memory controller 119, and the video signal processing circuit 116 provides image processing and a compression process. The number of consecutively captured images depends on the capacity of the buffer memory 122 and the image size in case of the panoramic imaging.

The memory controller 119 stores unprocessed digital image data input from the video signal processing circuit. 116 in a buffer memory 122, and processed digital image data in the memory 120. The image data is output to the video signal processing circuit 116 from the buffer memory 122 and the memory 120. The memory 120 may be attachable and detachable to the image-capturing apparatus. The memory controller 119 can output an image stored in the memory 120 via the external interface 121 connectable to a computer, etc. Reference numeral 123 denotes microcomputer.

Reference numeral 124 denotes an operating unit. The operating unit 124 transmits its state to the microcomputer 123, and the microcomputer 123 controls each component in accordance with a change of the operating unit 124.

Reference numeral 125 denotes switch 1 ("SW1" hereinafter). Reference 126 denotes switch 2 ("SW2" hereinafter). The switch SW1 125 and the switch SW2 126 are switches that turns on and off by an operation of a release switch, and each switch is one of input switches of the operating unit 124. The switch SW1 125 turns on in a half-pressed state of the release button, providing the autofocus and photometry. Both the switches SW1 125 and SW2 126 turn on in a fully pressed state of the release button for recording the image. The image is captured in this state. While the switches SW1 125 and SW2 126 turn on, the consecutive imaging is available.

The operating unit 124 further includes an ISO set button, a menu button, a set button, a flash set button, a single capture/consecutive capture/self-timer switch button, a plus moving button so as to change the menu and reproduced image. The operating unit 124 further includes a minus moving button, an exposure correction button, a display image enlargement button, a display image reduction button, reproduction switch, a diaphragm button configured to set the diaphragm 103 to the set F-number, and an erase button for erasing a captured image. The operating unit 124 further includes information display buttons relating to the image-capturing, reproduction, etc., configured to detect the state of the switch. A rotary dial switch having functions of the plus and minus buttons can smoothly select a numerical value and function. The operating unit. 124 serves as a commander configured to command the AF.

Reference numeral 127 denotes a liquid crystal driving circuit. Reference numeral 128 denotes an external liquid crystal display unit. Reference numeral 129 denotes an inter-finder liquid crystal display unit. The liquid crystal driving circuit 127 drives the external liquid crystal display unit 128 and the inter-finder liquid crystal display unit 129 configured to display an operation state, a message, etc. using a letter and an image in accordance with the display contents command from the microcomputer 123. The inter-finder liquid crystal display unit 129 includes a backlight unit, such as an unillustrated LED, and the LED is also driven by the liquid crystal driving circuit 127. The microcomputer 123 can calculate the number of remaining captures based on the ISO speed, the image size, and predicted value data of the image size depending on the image quality that are set before the image-capturing while confirming the memory capacity through the memory controller 119. If necessary, the information can be displayed on the external liquid display unit 128 and the inter-finder liquid crystal display unit 129.

Reference numeral. 130 denotes a nonvolatile memory EEPROM configured to store data even when the camera not powered on. Reference numeral 131 denotes a power unit. The power unit 131 supplies necessary power to each IC and a driving system. Reference numeral 132 denotes an internal clock. A capture time etc, can be attached to an image file recorded in the memory 120, and a capture time can be superimposed to the image, as described above.

Reference numeral 133 denotes a two-axis or three-axis gyroscope or gyro sensor (position detector) configured to detect an angular speed of a swing of the image-capturing apparatus. Reference numeral 134 denotes a thermometer, which may be located near the gyroscope 133 for the purpose of this embodiment but a temperature detector usually located near the image sensor 112, the memory 120, etc. so as to protect the image-capturing apparatus and the memory 120 may be applied.

Figure 6:
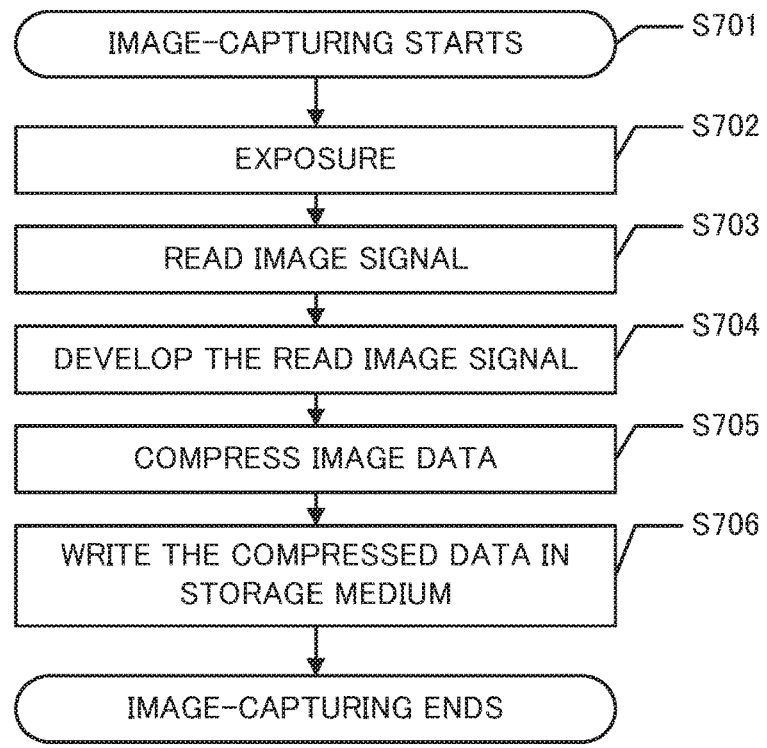
FIG. 6 is a flowchart for explaining a normal image-capturing action.

FIG. 6 is a flowchart for explaining a normal image-capturing action executed by the microcomputer 123, and "S" stands for the step. The flowchart illustrated in FIG. 6 can be implemented as a program configured to enable a computer to execute a function of each step. This program can be stored in a storage unit in the image-capturing apparatus 100, such as the nonvolatile memory 130 and a non-transitory computer-readable storage medium.

The exposure amount calculation circuit 109 previously calculates an exposure amount, and determines an F-number, a storage time period, and an ISO speed. When the user presses the SW2 126, the image-capturing starts in S701. The microcomputer 123 informs the diaphragm driving circuit 104 of the predetermined F-number, and sets the diaphragm. 103 to the target F-number. The image sensor 112, the A/D converter 115, and the like are powered on and the image-capturing is prepared. When the preparation is completed, the mirror driving circuit. 107 is driven and the object image can be formed on the image sensor 112. The shutter driving circuit 111 opens an unillustrated front curtain so that the object image can be formed on the image sensor 112. Next, after the predetermined storage time period passes, the unillustrated rear curtain is closed in the shutter 110 so as to introduce the light to the image sensor 112 during the storage time period. The exposure is performed through the series of actions (S702).

Next, the A/D converter 115 reads and sends an image signal to the video signal processing circuit 116, and the image signal is stored in the buffer memory 122 (S703). The development circuit 116k provides a development by converting the read image signal into image data (S704). At this time, additional image processing, such as a white balance process and a gain control in the dark part by the gamma correction circuit. 116b, may be provided for an appropriate image.

The obtained image is converted into a universal data format, such as JPEG, by a compression/decompression circuit 116l (S705), and stored in the memory 120, such as an SD card and a compact Flash® memory (S706). Then, the process ends. Instead of providing the image processing and the development process (S704), the read image signal may be reversibly compressed (S705) and stored in the storage medium (S706). The user can switch the process through the operating unit 124.

When the user sets the panoramic imaging mode with the operating unit 124, the power is supplied to the image sensor 112 and the A/D converter 115, and the initialization starts. The main mirror 105 moves up and the shutter driving circuit 111 opens the shutter 110 so that the object image can be formed on the image sensor 112 through the image-capturing optical system 101.

A signal from the image sensor 112 is converted into a digital signal by the A/D converter 115, developed by the development circuit 116k in the video signal processing circuit 116, and converted into a suitable image by the luminance adjustment circuit 116a and the gamma correction circuit. 116b. Next, the magnification varying circuit 116f varies the magnification of the image size suitable for the display unit 118, such as a liquid crystal monitor. A so-called live-view is performed by repeating the above process 24 to 60 times per one second.

The user confirms the display, and adjusts the angle of view. In the panoramic imaging, the SW1 125 is pressed after the image-capturing apparatus aims at the main object among a variety of objects in a wide range. When the SW1 125 is pressed, the exposure amount is calculated. In a non-live-view mode, the exposure amount calculation circuit 109 receives the light reflected on the sub mirror 106, and calculates an appropriate exposure amount. In the live-view, do unillustrated exposure amount calculation circuit in the video signal processing circuit 116 determines the appropriate exposure amount. The microcomputer 123 instructs the diaphragm driving circuit 104 to drive the diaphragm. 103, and controls the sensitivity and the storage time period of the image sensor 112. The AF driving circuit 102 drives the image-capturing optical system 101 for focusing. When the image-capturing preparation ends, an unillustrated buzzer notifies the user of the ready state.

Figure 7:
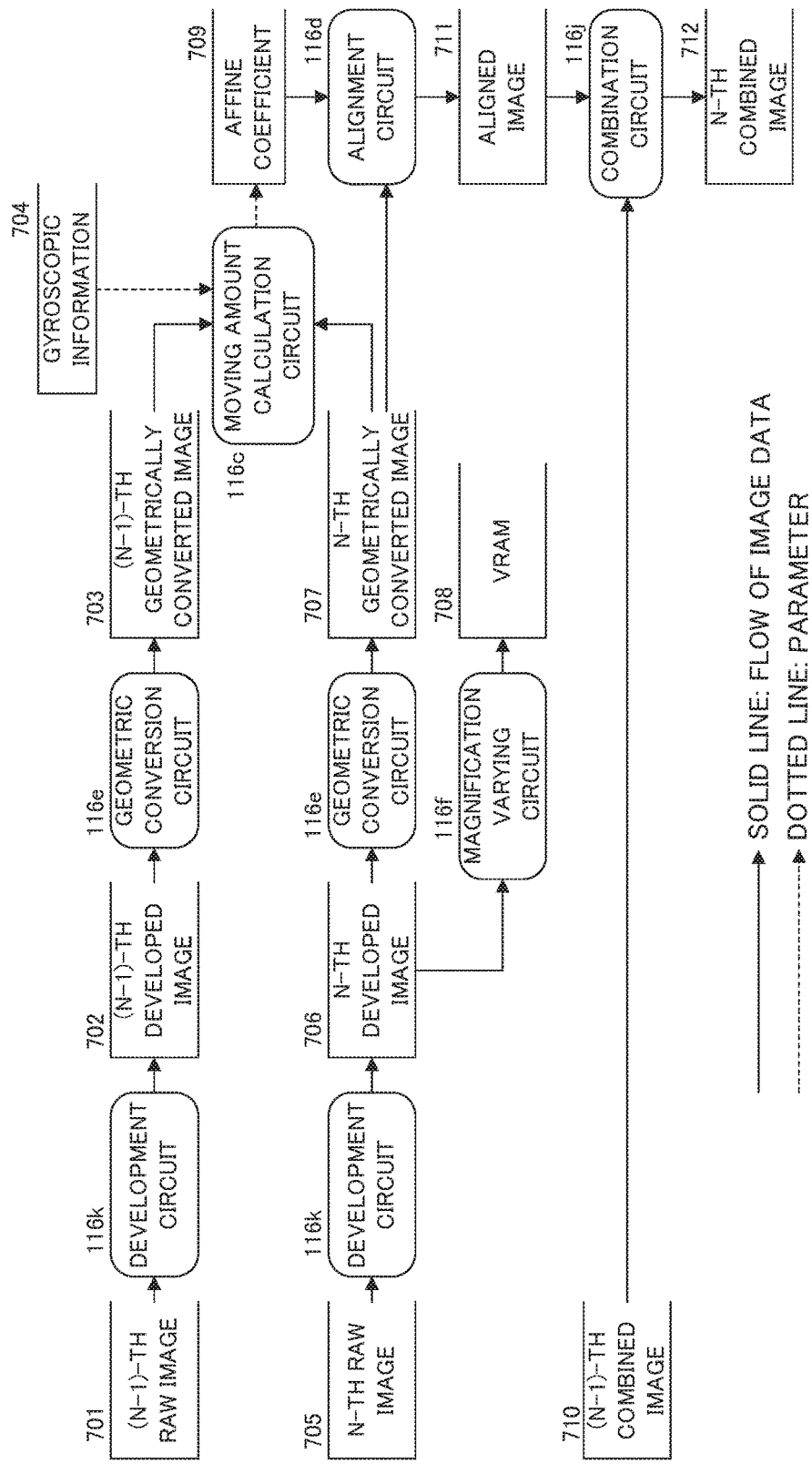
FIG. 7 is a data flow diagram in the panoramic imaging (image-capturing method) according to the first, second, and third embodiments.
Figure 8:
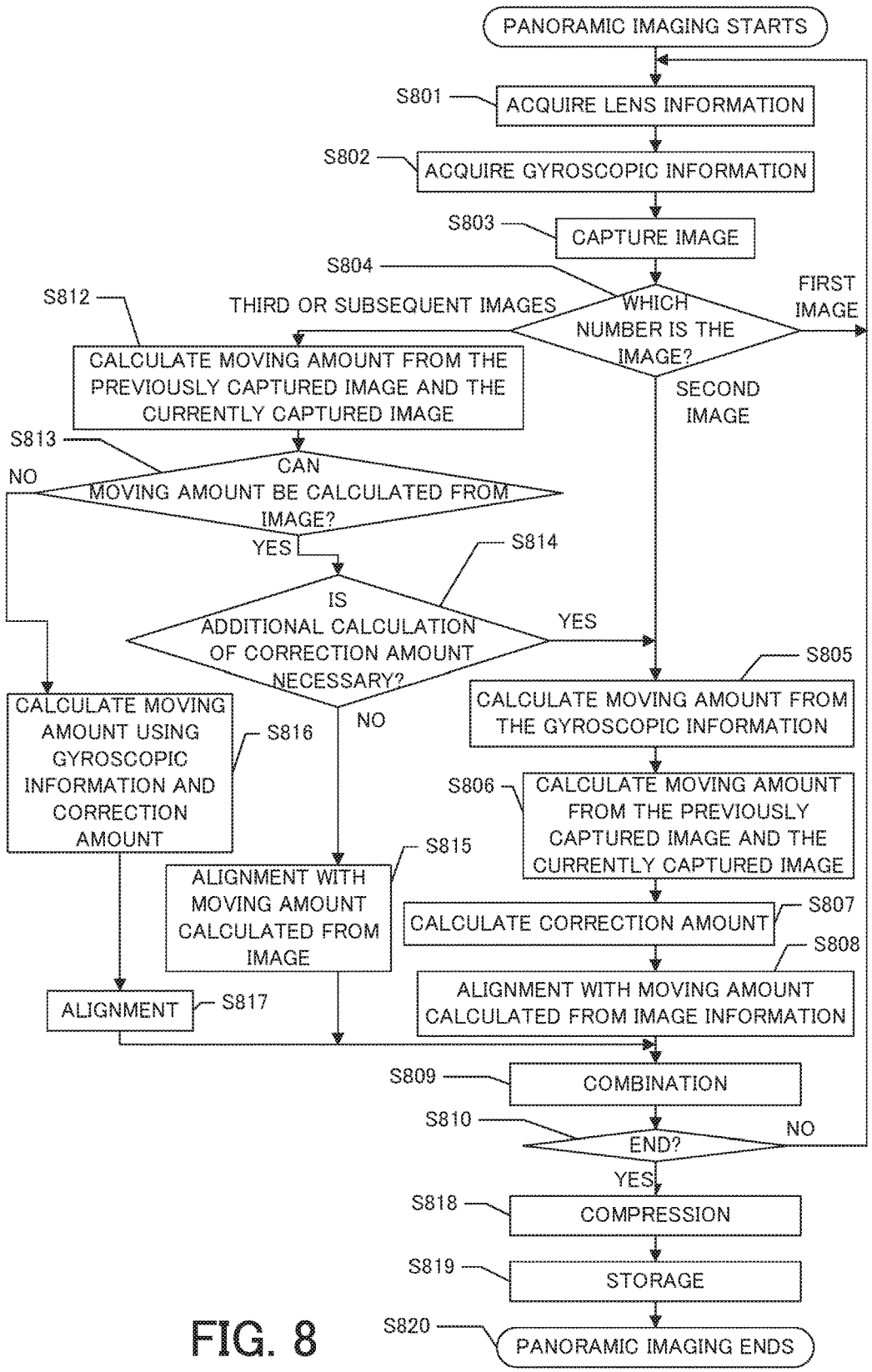
FIG. 8 is a flowchart for explaining the panoramic imaging (image-capturing method) according to the first, second, and third embodiments of the present invention.

Next, when the user turns the image-capturing apparatus to the desired direction and presses the SW2 126 for actual panoramic imaging. FIG. 7 is a data flow diagram in the panoramic imaging. FIG. 8 is a flowchart of the panoramic imaging executed by the microcomputer 123.

When the panoramic imaging starts, the microcomputer 123 initially obtains information (lens information) of the image-capturing optical system 101 (S801). The lens information contains following data for correcting the distortion and a drop of the light amount in the lens periphery, a focal length used to calculate the alignment amount from the following gyroscopic signal, distance information to the object, etc.

Next, the microcomputer 123 acquires the gyroscopic information from the gyroscope 133 (S802). The gyroscopic information contains two-axis information of the yaw and pitch directions relative to the image-capturing apparatus 100, but may contain three-axis information including the roll direction as the rotation relative to the optical axis. While an output from the gyroscope 133 is an angular speed, the panoramic imaging needs a swing angle from the previous capture. In the first image capture, this value is recorded in the memory 120. The angular speed is integrated to the next capture, and the swing angle is calculated from the previous capture in the second and subsequent image captures.

Next, the microcomputer 123 captures an image (S803). Since the image sensor 112 and the A/D converter 115 are set to the live-view drive mode, the microcomputer 123 switches this mode to the still image-capturing mode. The microcomputer 123 adjusts the diaphragm. 103 to the set exposure amount, opens and closes the shutter 110, and forms the object image on the image sensor 112.

The microcomputer 123 converts the object image formed on the image sensor 112 into a digital signal via the A/D converter 115, and stores it in the buffer memory 122. An unillustrated circuit in the video signal processing circuit 116 performs a correction, such as shading for the image sensor 112, for this image data. The minimum processed image data is referred to as a RAW image 705. Next, the microcomputer 123 develops the RAW image 705 through the development circuit 116k so as to form a YUV image 706.

Since the microcomputer 123 reduces the image via the magnification varying circuit 116f in accordance with the pixel number of the liquid crystal monitor so as display the captured image on the liquid crystal monitor in the display unit. 118, and stores the resultant image in a VRAM 708. The microcomputer 123 cylindrically converts the developed image 706 via the geometric conversion circuit 116e. At this time, the microcomputer 123 may correct the distortion of the image-capturing optical system 101.

The microcomputer 123 changes the process depending on the number of captured images (S804).

For the first image captured after the panoramic imaging starts, the process returns to S801 (S804), but may return to S802 for simplicity purposes. Usually, in the panoramic imaging, the image-capturing optical system 101 is maintained still but the image-capturing optical system. 101 may move due to the manual action of the user or the own weight of the image-capturing optical system 101. Hence, the microcomputer 123 may acquire the lens information again.

For the second image captured after the panoramic imaging starts, the process proceeds to S805. For the second captured image, the microcomputer 123 calculates the swing angle from the first captured image. The microcomputer 123 calculates a moving amount using that angle, the focal length of the lens information acquired in S802, the one pixel size of the image sensor 112, and Expression 2 (S805). For the two-axis gyroscope 133 in the yaw and the pitch directions, the moving amounts shifts in the X-axis horizontal direction and the Y-axis vertical direction. For the three-axis gyroscope containing the rolling direction, the moving amount of the swing component can be calculated. A method for calculating the affine coefficient from the moving amount will be described with reference to the following S807 and S808.

Next, the moving amount calculation circuit 116c calculates the moving amount on the second captured image 707 and the first captured image 703 (S806). A known method can be used to detect a moving amount, but the microcomputer 123 finds a plurality of feature points in the image via the moving amount detection circuit 116c, and calculates the affine coefficient 709 through sampling. The feature point can be extracted as described above.

Thus, the microcomputer 123 detects an edge, extracts a feature point, and calculates a moving amount. Assume that feature point 1 is moved from a coordinate (x1, y1) to a coordinate (u1, v1), feature point 2 is moved from a coordinate (x2, y2) to a coordinate (u2, v2), and feature point 3 is moved from a coordinate (x3, y3) to a coordinate (u3, v3). The following expression is established from Expression 1.

$$\begin{pmatrix} x1 & y1 & 1 \\ x2 & y2 & 1 \\ x3 & y3 & 1 \end{pmatrix} \begin{pmatrix} a \\ b \\ c \end{pmatrix} = \begin{pmatrix} u1 \\ u2 \\ u3 \end{pmatrix} \quad (3)$$

$$\begin{pmatrix} x1 & y1 & 1 \\ x2 & y2 & 1 \\ x3 & y3 & 1 \end{pmatrix} \begin{pmatrix} d \\ e \\ f \end{pmatrix} = \begin{pmatrix} v1 \\ v2 \\ v3 \end{pmatrix} \quad (4)$$

The affine coefficient can be calculated by solving these equations. When three or more feature points are detected, close points are excluded and normalized by the least squares method. When three feature points are not found, or when extracted three points are linearly arranged, or when two out of three points are close to each other, a calculation of a moving amount is determined to fail. When the calculation of the moving amount fails at this time, the third embodiment is applicable.

The microcomputer 123 calculates a difference between the moving amount calculated from the image and the moving amount calculated from the information of the gyroscope 133 in S805, and finds the correction amount (S807). The moving amount calculated by Expression 2 based on the signal from the two-axis gyroscope 133 in the yaw and pitch directions is only a parallel movement or only c and f concerning the parallel movement in the affine coefficients in Expression 1. Therefore, the microcomputer 123 converts the two moving amounts, i.e., the moving amount calculated from the image and the moving amount from the information from the gyroscope 133, into the affine coefficients, subtracts the affine coefficients from each other, and sets the coefficients to a=1, b=0, d=0, and e=1 so as to leave the moving components. When the swing component is applied with the three-axis gyroscope, the microcomputer 123 also uses the affine coefficients a, b, d, and e. A person skilled in the art can handle with it through a matrix calculation.

As described above, a difference can occur between the moving amount from the image and the moving amount from the gyroscope 133. The moving amount from the gyroscope 133 contains an error caused by the temperature, etc. The moving amount from the image contains an error of a focal length of the image-capturing optical system, a parallax caused by a shift from the swing center of the image-capturing apparatus 100 from the nodal point, and an error caused by a shaft of an angle of view caused by use of a conversion tens or underwater imaging. Since the images are aligned and combined with one another, it is effective to use the moving amount obtained from the image information. However, when the moving amount cannot be calculated from the image, the alignment is made with the moving amount from the gyroscopic information and the correction amount is thus calculated.

Next, the microcomputer 123 aligns the images via the alignment circuit 116d based on the moving amount (affine coefficient) from the image calculated in S806 (S808), and generates the aligned images 711.

Next, the microcomputer 123 generates a combined image 712 by combining the combination result or the first captured image 710 with the aligned second captured image 711 via the combination circuit 116j (S809). At this time, any moving objects, such as a water surface, degrades the combination process and thus the image quality may be improved by changing a combination ratio at the boarder of the image. While the SW2 126 is being pressed, the process returns to S801 (3810) but may return to S802 for simplicity purposes.

For the third or subsequent images captured after the panoramic imaging starts, the process proceeds to S812. Similar to S805, the microcomputer 123 calculates a moving amount from the previously captured image (such as the second geometric conversion result 703) and the currently captured image (such as the third geometric conversion result 707) (S812). In order to save the memory capacity, the moving amount may be calculated based on the hitherto combined result 710 and the current geometric conversion result 707. A method for calculating the moving amount as described for S805.

Next, the microcomputer 123 determines whether the moving amount can be calculated from the image (S813).

The microcomputer 123 determines whether or not the additional calculation of the correction amount is necessary when determining that the moving amount can be calculated from the image (S814). The microcomputer 123 in the first embodiment determines that the additional calculation of the correction amount is unnecessary, aligns images using the calculated moving amount (affine coefficient) (S815), and combines the aligned images (S809).

On the other hand, the microcomputer 123 when determining that the moving amount cannot be calculated from the image in S813, calculates the affine coefficient based on the information from the gyroscope 133 (S816). At this time, the correction amount calculated in (S807) is added. For example, when the gyroscope 133 is a two-axis gyroscope in the yaw and pitch directions, the c and f terms may be added in the affine coefficients in Expression 1. The a, b, d, and e terms are necessary for the correction in the roll direction. The microcomputer 123 aligns the images based on the thus calculated moving amount (affine coefficient) (S817), and combines the images (S809).

When the user releases the SW2 126 or the combined result 712 is larger than the predetermined size, a series of processes are repeated until the user's operation ends. When the end is commanded, the microcomputer 123 compresses the images in a universal format, such as JPEG, through the compression/decompression circuit 116*l* (S818), and stores the result in the memory 120 (S819). Before the compression, the gamma correction configured to clarify the dark of the combined image, and a correction configured to make uniform the hue of the entire image may be performed. Since the thus obtained image is large, the magnification of the image size may be varied to the user predefined size via the magnification varying circuit 116*f*.

According to the first embodiment, the microcomputer 123 calculates the correction amount for future use with the moving amount from the gyroscopic information based on the difference between the moving amount from the gyroscopic information and the moving amount calculated from the image after the image-capturing starts in S806. When the microcomputer 123 aligns the images using the moving amount from the gyroscopic information without calculating the moving amount from the image (S808), the microcomputer 123 corrects the moving amount from the gyroscopic information with the correction amount calculated in S806 (S816), and aligns the images (S817). Thereby, a highly precise panoramic image can be generated.

The correction amount is calculated only once at the outset in this example, but the correction amount may be calculated in the live-view state just after the AF operation ends, because the moving amount cannot always be calculated at the outset. Since the AF is performed for the main object, many edges are included and it is easy to calculate the alignment amount based on the image.

In the live-view display, the image capturing, development, and display are repeated 24 to 60 per one second. Since the once processing time period is short, there usually no time to recall whole pixel information from the image sensor 112 and thus some pixels are thinned out to some extent and read out. For example, when only one pixel out of three pixel is read out, the moving amount is three times as large as that of the still image-capturing and it is thus necessary to adjust the moving amount calculated according to the thinning ratio in the readout.

Since the image-capturing apparatus is not moved in the AF, the moving amount calculated from the image is close to 0. Although this method is suitable for the correction of the offset of the gyroscope 133, this method is not suitable for the correction of an error of the focal length and the underwater imaging when the conversion lens is attached to the image-capturing optical system 101. Thus, this method may be auxiliary used in combination with the above example in which a correction is made with the first image and the second image captured after the panoramic imaging starts.

Second Embodiment

The first embodiment initially calculates the correction amount after the panoramic imaging starts or in the live-view before the panoramic imaging starts. This method works when the consecutive capture speed is constant, but when the consecutive speed is not constant, or when the time interval between captures is not constant, it is necessary to consider the temporal factor. For example, when the offset change caused by the temperature characteristic of the gyroscope 133 is to be corrected, the offset has an error in proportion to the time period between frames. Hence, when a time period between frames when the correction amount is calculated x times as long as that in the panoramic imaging, it is necessary to correct (n times multiply) the affine coefficients c and f terms of the correction amount.

When the correction factor is caused by the conversion lens, the time interval between the frames is not affected. It is unnecessary to adjust the correction amount using the image capturing time interval. The last correction amount may be used when the correction factor is caused by the swing state of the image-capturing apparatus. As illustrated in FIG. 4, the angular speed changes when the swing radius is not constant. Therefore, the correction amount may be calculated a plurality of times and the correction amount for a similar angular speed may be used. When the swing center is not a nodal point, the parallax occurs. Since the parallax amount is different when the distance to the object is different, the correction amount calculated with a similar distance to the object may be used.

According to the second embodiment, the correction amount is calculated a plurality of times. The microcomputer 123 in the second embodiment is similar to that in FIG. 8. S814 will be described which is omitted in the first embodiment. In the first embodiment, the process always proceeds to S815, but the microcomputer 123 in the second embodiment determines whether the additional calculation of the correction amount is necessary (S814).

As described above, when the distance to the object changes, when the swing speed changes, or when the temperature of the gyroscope 133 changes, the microcomputer 123 determines that the additional calculation of the correction amount is necessary and moves to S805. When many feature points can be extracted and when the moving amount of the plurality of feature points less scatters in calculating the moving amount from the image, the reliability is generally high and the correction amount may be updated.

In other words, the microcomputer 123 stores, in a table format, the correction amount calculated in S807 by correlating it with an optical characteristic, such as a distance to the main object, a position of the focus lens, and a focal length, an angular speed, a temperature, a reliability of the moving amount. The storage format is not limited to this embodiment. Alternatively, the microcomputer 123 may always calculate a new correction amount, or use the last correction amount when the correction is necessary. In this case, the microcomputer 123 may always determine "yes" in S814, and move to S805.

The microcomputer 123 selects a proper correction amount while a plurality of correction amount are being recorded (S816). For example, in calculating the correction amount based on a change of the angular speed of the gyroscope 133, the microcomputer 123 selects, in S816, the correction amount calculated when the angular speed is close to that acquired in S802. The distance to the object, the temperature, etc. similar. When the correction amount is always calculated if the moving amount can be detected from the image, the last calculated correction amount may be used for S816.

In properly acquiring a correction amount a plurality of times and actually correcting the moving amount from the gyroscopic information, the second embodiment can improve the correction precision and generate a highly precise panoramic image, by selecting a proper correction amount from among a plurality of correction amounts and by using it for the correction.

Third Embodiment

The first embodiment calculates a correction amount (S807) using the first and second images captured after the panoramic imaging starts. When the alignment cannot be detected from the image, the user may be informed of an error (panoramic imaging failure) but this not always the best for the user. According to the third embodiment, the microcomputer 123 stores the captured image(s) in the buffer memory 122 until the initial correction amount can be calculated, and combines the images after the correction amount is calculated.

In the panoramic imaging, the combined result is a large image, and needs a large capacity of the buffer memory 122. When the panoramic imaging starts, the area of the combined image 712 is little used. Therefore, buffering is available without redundantly preparing for a memory by temporarily using the lower address in this memory.

It is unnecessary to buffer the entire surface of the image 703 after the geometric conversion. A work area can be roughly calculated based on the uncorrected alignment amount and the gyroscopic signal. When the error of the offset component of the gyroscope 133 is corrected, a shift of 10% between the moving amount calculated from the signal from the gyroscope 133 and the moving amount calculated from the image is less likely to occur, even when an output from the gyroscopic information is not corrected. Accordingly, the microcomputer 123 calculates the necessary area of the image 703 based on the moving amount from the gyroscope 133, and performs buffering by trimming the area made by adding an extra area of 5 to 20% to the above necessary area using the trimming circuit 116g. The value, as used herein, depends on the precision of the gyroscopic 133, and is not limited. A wide buffering area is necessary for a wide correction, for example, when the image-capturing optical system 101 is configured to vary the focal length or in case of the underwater imaging.

In general, the image-capturing apparatus 100 stops before the panoramic imaging starts, and swings as soon as the panoramic imaging starts. The swing speed is slow a predetermined time period after the panoramic imaging starts, and the common area between images is wide. It is thus unnecessary to buffer all captured images, and the captured images may be thinned out and buffered. Thinning depends on the remaining common area of the thinned images, and varies according to an angle of view and an angular speed of the image-capturing optical system 101. Usually, the alignment of the images needs almost half the original image. In this case, it is known that the alignment amount from the image cannot be calculated, and thus the common area necessary for the combination is sufficient and the area necessary for detection unnecessary. For example, when the image-capturing apparatus 100 is swung from the left to right or vice versa, the tall image of about 20% to 40% relative to the horizontal direction from the center of the original image may be buffered. The entire area may be buffered in the vertical direction. As described above, this size changes according to the image-capturing optical system 101, the swing speed, etc., and is not limited.

For example, in generating a panoramic image of 360° using the image-capturing optical system having a horizontal angle of view of 60°, the combined image 712 needs sextuple as large as the original image. Assume that the area necessary for buffering is 20%. Then, buffering for 18 images is necessary. In the usual use, it is conceivable that the moving amount can be calculated based on the image while 18 images are being captured, but when it cannot be calculated, an error is notified or the combination is made without correcting the output from the gyroscope 133.

The third embodiment buffers the captured image, if necessary, and can generate a highly precise panoramic image even when the correction amount cannot be calculated after the panoramic imaging starts.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-237264, filed Dec. 4, 2015, which is hereby incorporated by reference herein in its entirety.

What is claimed is:
1. An image-capturing apparatus comprising:
an image sensor configured to capture a plurality of images;
a first acquirer configured to acquire first information related to a first moving amount of the image calculated by using the plurality of images captured by the image sensor;
a gyro, having a sensor configured to detect a position change of the image capturing apparatus;
a second acquirer configured to acquire second information related to a second moving amount of the image captured by the image sensor, the second moving amount calculated using information output from the gyro;
an aligner configured to align the plurality of images; and
a combiner configured to generate a panoramic image by combining the plurality of images aligned by the aligner,
wherein the first acquirer acquires the first information of the first moving amount by searching a feature point which is same as a feature point in a first frame in an image of a second frame, and a search range is determined based on a position information of the image capturing apparatus, and wherein when the first acquirer cannot acquire the first information of a target frame, the aligner aligns the plurality of images based on a calculated difference moving amount between the first moving amount indicated by the first information and the second moving amount indicated by the second information of frames, excluding the target frame among the plurality of images used in the calculation of the first moving amount, and the second moving amount indicated by the calculated second information corresponding to the target frame.

2. The image-capturing apparatus according to claim 1, wherein the image-capturing apparatus is configured to provide a live-view that sequentially displays the plurality of images, and wherein the aligner acquires the difference moving amount in the live-view.

3. The image-capturing apparatus according to claim 1, wherein the aligner acquires the difference moving amount a plurality of times in generating the panoramic image, and selects one of a plurality difference moving amount used for the aligner.

4. The image-capturing apparatus according to claim 3, wherein the aligner stores information representative of a state of the image-capturing apparatus when acquiring each of the a plurality of difference moving amounts by correlating the information representative of the state of the image-capturing apparatus with each difference moving amount, and selects the difference moving amount used for the aligner based on the information representative of the state of the image-capturing apparatus.

5. The image-capturing apparatus according to claim 4, wherein the aligner selects the difference moving amount based on information of a speed of the image-capturing apparatus.

6. The image-capturing apparatus according to claim 4, wherein the aligner selects the difference moving amount based on information of an optical characteristic of the image-capturing apparatus.

7. The image-capturing apparatus according to claim 6, wherein the optical characteristic is at least one of a distance to an object, a position of a focus lens in an image-capturing optical system configured to form an optical image of the object, and a focal length of the image-capturing optical system.

8. The image-capturing apparatus according to claim 1, further comprising a storage unit configured to store an image for which the aligner does not acquire the difference moving amount, wherein after the aligner acquires the difference moving amount, the aligner acquires the difference moving amount for the image stored in the storage unit.

9. The image-capturing apparatus according to claim 8, further comprising a controller configured to determine whether there is redundancy in generating the panoramic image, and the controller does not store an image determined to be redundant, in the storage unit.

10. An image processing method comprising the steps of:
acquiring a plurality of images;
acquiring first information related to a first moving amount of the image calculated by using the plurality of images;
acquiring second information related to a second moving amount of the image acquired by using information output from a gyro of an image-capturing apparatus, the information output comprising a detected position change information, and the second moving amount calculated by using information output from the gyro;
aligning the plurality of images; and
generating a panoramic image by combining the plurality of images aligned,
wherein the first information of the first moving amount is acquired by searching a feature point which is same as a feature point in a first frame in an image of a second frame, and a search range is determined based on a position information of the image-capturing apparatus, and
wherein when the first information of a target frame cannot be acquired, the aligning step aligns the plurality of images based on a calculated difference moving amount between the first moving amount indicated by the first information and the second moving amount indicated by the second information of frames excluding the target frame among the plurality of images used in the calculation of the first moving amount, and the second moving amount indicated by the calculated second information corresponding to the target frame.

11. A non-transitory computer-readable storage medium configured to store a program that enables a computer to an image processing method comprising the steps of:
acquiring a plurality of images;
acquiring first information related to a first moving amount of the image calculated by using the plurality of images;
acquiring second information related to a second moving amount of the image acquired by using information output from a gyro of an image-capturing apparatus, the information output comprising a detected position change information, and the second moving amount calculated by using information output from the gyro;
aligning the plurality of images; and
generating a panoramic image by combining the plurality of images aligned,
wherein the first information of the first moving amount is acquired by searching a feature point which is same as a feature point in a first frame in an image of a second frame, and a search range is determined based on a position information of the image-capturing apparatus, and
wherein when the first information of a target frame cannot be acquired, the aligning step aligns the plurality of images based on a calculated difference moving amount between the first moving amount indicated by the first information and the second moving amount indicated by the second information of frames excluding the target frame among the plurality of images used in the calculation of the first moving amount, and the second moving amount indicated by the calculated second information corresponding to the target frame.

12. The image-capturing apparatus according to claim 1, wherein when the first acquirer can acquire the first information of a target frame in the plurality of images, the aligner aligns an image of the target frame based on the first moving amount indicated by the first information of the target frame.

13. The image-capturing apparatus according to claim 1, wherein the first acquirer acquires the first information of the first moving amount based on an image of a first frame and an image of a second frame in the plurality of images, and wherein the aligner sets an image of a third frame which is different from the image of the first frame and the image of the second image to be an image of the target frame.

14. The image-capturing apparatus according to claim 12, wherein when the first acquirer cannot acquire the first information of the target frame, the aligner aligns the plurality of images based on a difference moving amount of a frame in which the first information can be acquired and which is the closest to the target frame in terms of an image—capturing time among frames except for the target frame, and the second moving amount indicated by the second information corresponding to the target frame.

15. The image-capturing apparatus according to claim 12, wherein an accuracy of information on the gyro varies depending on a time in which the image sensor operates.

16. The image-capturing apparatus according to claim 12, wherein an accuracy of information on the gyro varies depending on a temperature of the image sensor.

* * * * *